July 16, 1935.   G. L. WALKER   2,008,232
TORCH
Filed April 19, 1933
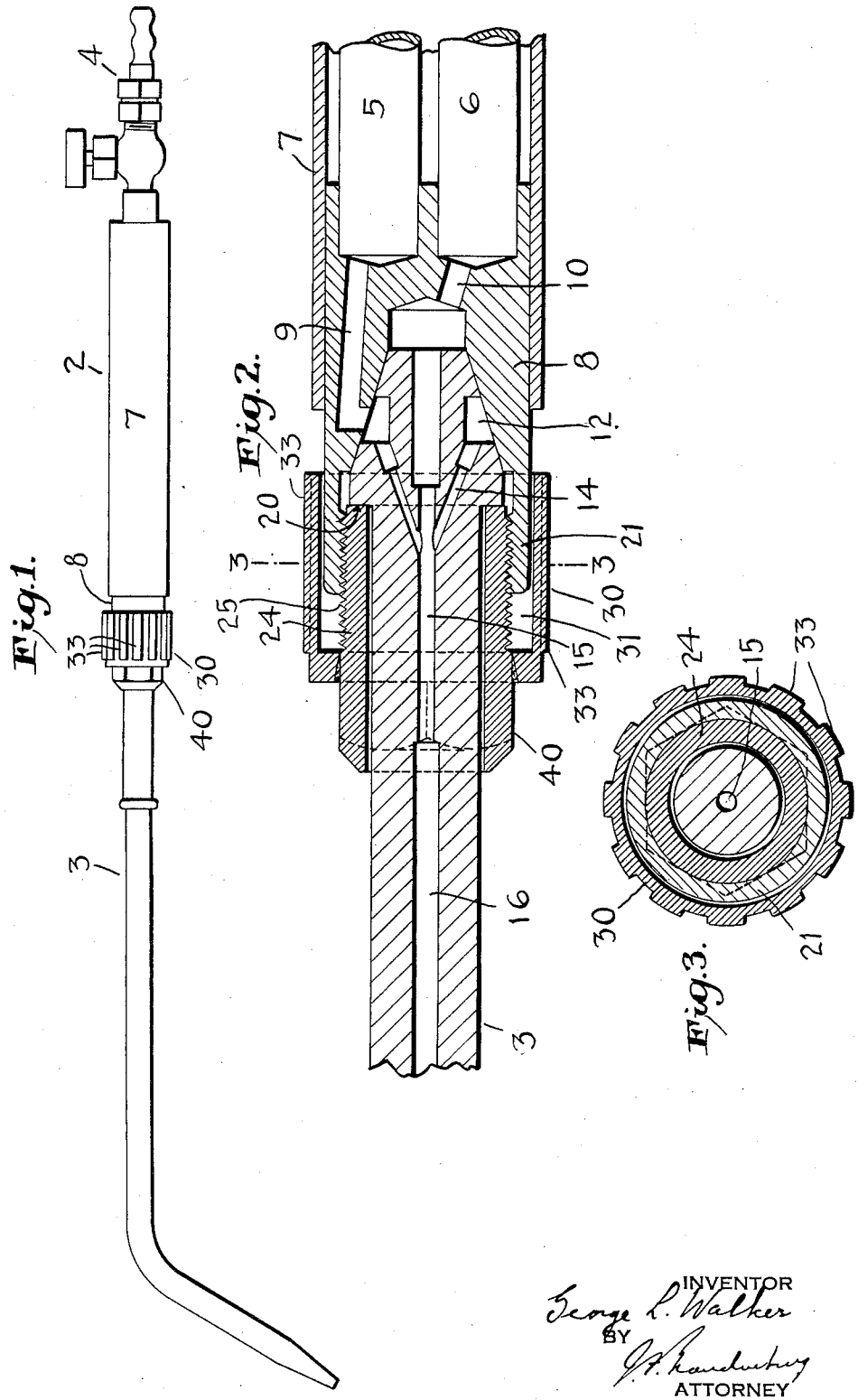

Patented July 16, 1935

2,008,232

UNITED STATES PATENT OFFICE 2,008,232

TORCH

George L. Walker, Jersey City, N. J., assignor to Air Reduction Company, Incorporated, New York, N. Y., a corporation of New York Application April 19, 1933, Serial No. 666,807

3 Claims. (Cl. 158—27.4)

In oxyacetylene and other oxy-fuel-gas or oxy-fuel-vapor torches, for welding or cutting, it is customary to provide a series of tips of different powers, which can be applied interchangeably to the same torch or torch body. The head of the torch or torch body has a seating portion of one or another of the known conformations, and each tip of a set has a like or complemental seating portion. The gas or gases pass from the head to the tip through these seating portions, which must be accurately made and tightly forced together in order to prevent leakage. Two kinds of tip nuts have been used for securing the tips to the heads in this manner, and for making possible the removal and application of the tips. Both kinds of nuts are rotatable about the tip and bear against a shoulder thereon, so that when the nuts are screwed up in engagement with threads on the head, the seating portion of the tip is firmly and tightly clamped against the seating portion of the head. The external type of tip nut screws on the outside of the head, giving rise to the disadvantage that the screw-thread on the head is exposed. A neater and more compact construction, in which the threads of the torch head are protected results from the use of an internal tip nut, which screws into the head.

The purpose of this invention is to retain the advantage of the internal tip nut construction and to secure other important advantages. Among these objects is to make it possible to remove the tip quickly by direct manipulation, without the use of a wrench, and also to make it easy to apply enough force by the hand alone to tighten the tip in the head sufficiently to prevent a leak across the seat. Another object is to provide for wrench operation as well as for simple hand operation. Still another object is to provide a tip nut having such advantages and which is neither unduly long nor unduly heavy. The weight of a torch and its balance are of some importance in the handling of the torch to do good welding or cutting. Yet another object is to protect the threads of the tip nut. It thus results that the threads of neither the head nor the nut are exposed to injury.

In accordance with this invention, the tip nut is provided with a cylindrical skirt extending rearward over the threaded portion of the nut and spaced therefrom by an annular recess just wide enough to accommodate the wall of the torch head, so that the skirt encompasses the head freely yet closely. This skirt affords a broad zone for grasping with the fingers, its outer surface being knurled, fluted or otherwise treated to provide a satisfactory grip for the hand. The nut is also provided with a short forward portion, the formation of which is such that a wrench can be applied if desired.

Other advantages are that the tip nut is economical to manufacture and adds to the neatness of the torch.

In the accompanying drawing, forming part hereof:

Fig. 1 is an elevation of a welding torch to which the invention is applied;

Fig. 2 is a longitudinal section on a larger scale through portions of the torch body and the tip, connected by the tip nut, the plane of the section being perpendicular to Fig. 1; and Fig. 3 is a cross-section on the line 3—3 of Fig. 2.

The body of the torch, or as it is frequently termed, the torch is designated by the reference character 2, and the tip is marked 3. The torch shown for purpose of illustrating the invention is a welding torch. Connections 4 at the rear end of the torch body (one of these being seen in Fig. 1) receive the hoses through which oxygen and fuel gas, respectively, are supplied to the torch. The gases pass through tubes 5, 6 inside the handle casing 7 to the head 8 at the forward end of the torch body, and this head is provided with suitable passages 9 and 10. Which passage is for oxygen and which for fuel gas or fuel vapor is not material, since it has been found that by proper proportioning the flows of oxygen and fuel can be reversed as between the passages in the torch and in the tip. For convenience the tube 5 and passages and ports supplied therefrom may be regarded as representing the oxygen flow, and tube 6 etc. may be taken for the acetylene or fuel flow.

The torch that is selected for illustration is of the conical seat construction. In such a torch the head has a smooth conical sealing socket and the rear end of the tip, or the mixer, has a conical exterior form to fit exactly in the socket. One gas is brought into the rear end of the cavity through the passage 10, and enters a passage 11 in the rear end of the tip. The other gas passes through the side of the socket into an annular chamber 12, from which it is jetted through precisely dimensioned ports 14, the relation between these ports and the associating passage 15 of the tip being such that the gases are introduced to each other in the proper proportions. From the passage 15, the mingling gases flow onward through a preferably larger mixing passage 16 and eventually to the outlet orifice of the tip. In any internal mixing tip torch, the seal between the torch and the mixer must prevent interflow of the gases across the seat between the component gases before they pass the metering or proportioning ports, and also leakage outside of the torch.

The tip, or its mixer has a well-known shoulder 20 just forward of the seal. The head 8 has an annular wall 21 which extends forward from the position which this shoulder takes when the tip is assembled with the torch. The inner surface of this wall is screw-threaded. The tip nut 24 has an external thread 25 to engage the internal thread of the torch head. The rear end of the screw-threaded part of the nut bears against the shoulder 20 when the tip is forced into sealing contact with the head.

The novelty relates more particularly to the skirt 30. This is a relatively light hollow cylinder which is united to or formed integral with the tip nut, in such a way as to cover a substantial part of the cylindrical torch head, into which the nut screws internally. This skirt is united to the tip nut, either at the front of the nut or somewhat behind its front end, and extends rearward, coaxially parallel with the screw-threaded portion of the nut. The annular recess 31 between the nut and the inside of the skirt receives the thickness of the internally threaded wall 21 of the head 8, and the skirt encircles this wall with a sufficient clearance. The skirt and the head are substantially parallel, coaxially. The outside of the skirt has flutes 33 or the like so that a strong twisting grasp can be easily exerted on the tip nut.

For convenience of construction the nut proper and the skirt may be made in two parts, as shown, the forward end of the outer or skirt piece being brought in to the inner nut piece 24 and having an angular (hexagonal) opening, which is silver-soldered or brazed to a correspondingly angular portion of the inner nut piece.

In this construction the front end of the skirt piece 30 is united to the inner piece 24 at a region intermediate the ends of the latter, so that an angular nose of the piece 24 protrudes from the skirt piece and affords means to cooperate with a wrench, whenever that may be desired or may become necessary in order to make the tip tight or to release a tip from the torch. For the most part, a hand grip applied to the knurled or fluted skirt 30 is sufficient.

The skirt 30 covers the external screw-threads on the nut, and the screw-threads of the head are protected by being internal. The skirt preferably extends rearward beyond the screw-threaded part of the tip nut, but complete protection of these threads, while desirable, is not absolutely essential.

The invention is applicable to cutting torches as well as to welding torches. It is also applicable to cutting or welding torches in which the gases are mixed in the body of the torch rather than in the tip. Finally, it is applicable to the securement and sealing in torch heads of mixers to which separate tips may be applied. The term "tip" as used in the claims need not, therefore, be taken in a precisely limiting sense. The description and illustration of the preferred embodiment of the invention is illustrative rather than limiting.

I claim:

1. In a torch having a head provided with an internally threaded wall and with an internal seat for a tip or mixer, the improvement comprising a tip nut which has an externally threaded portion to enter the head and an external skirt adapted to extend rearward over the outside of the head, said skirt being long enough to extend rearward over the threaded portion of the nut, so as to protect the same, and being of such length and so formed on the outside that the tip nut can be operated directly by hand.

2. In a torch having a head provided with an internally threaded wall and with an internal seat for a tip or mixer, the improvement comprising a tip nut which has an externally threaded portion to enter the head, a forward portion shaped to receive a tool, and an external skirt adapted to extend rearward over the outside of the head, said skirt being long enough to extend rearward over the threaded portion of the nut, so as to protect the same, and being of such length and so formed on the outside that the tip nut can be operated directly by hand.

3. In a torch having a head provided with an internally threaded wall and with an internal seat for a tip or mixer, the improvement comprising a tip nut composed of an inner piece the forward portion of which is shaped to receive a tool and the rearward portion of which is externally threaded to engage the internal threads of the head, and an outer piece the forward end of which is united to the inner piece at a region intermediate the ends of the inner piece so that the tool-receiving portion of the inner piece protrudes from the outer piece, said outer piece constituting a skirt having a cylindrical inner surface enabling it to extend rearward over the torch head and being provided with an external formation which affords a grip for turning the nut by hand.

GEORGE L. WALKER.